Patented Feb. 24, 1925.

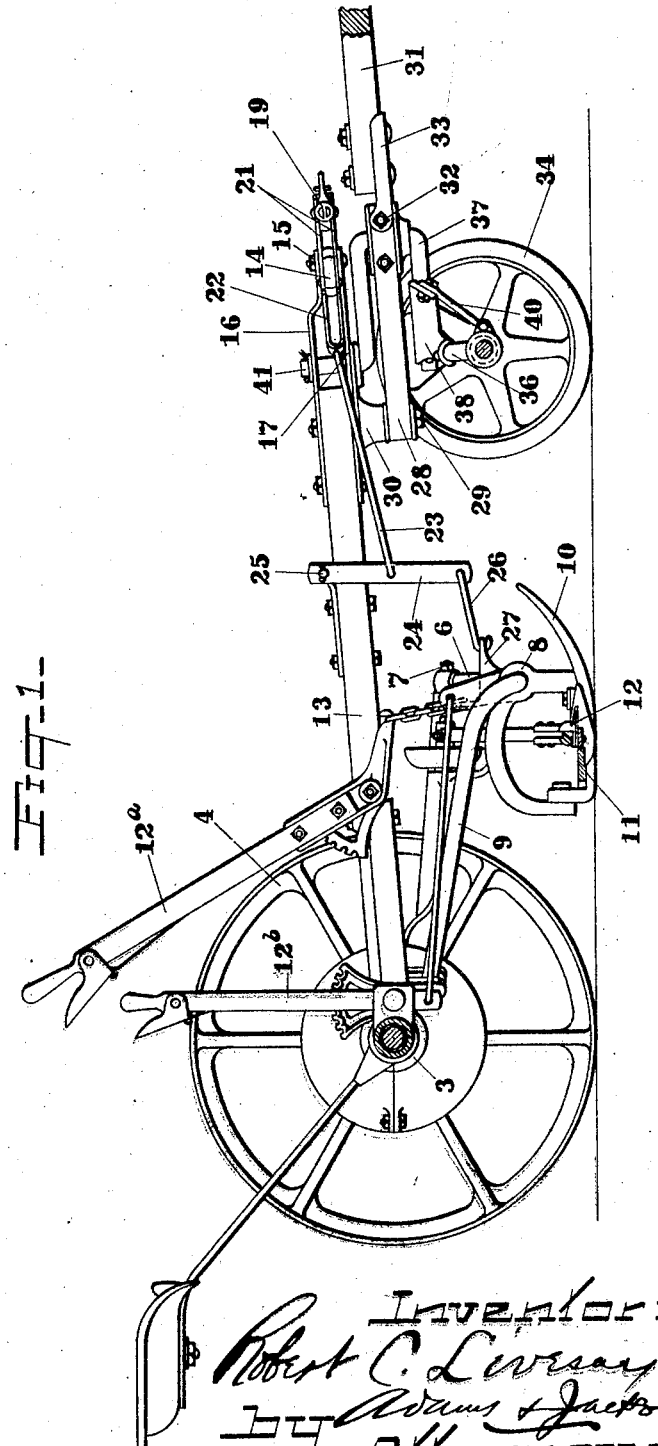

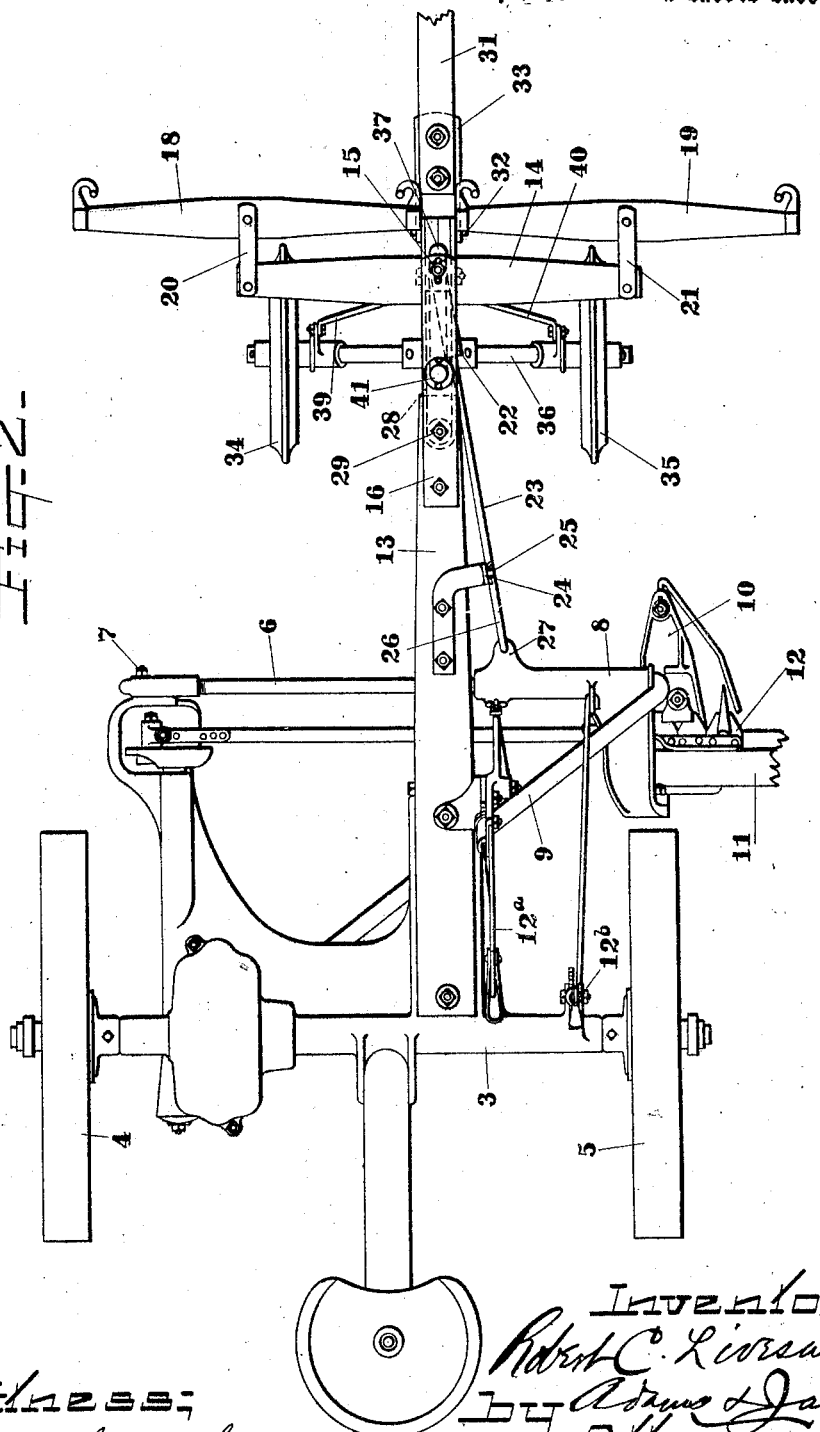

1,527,565

UNITED STATES PATENT OFFICE.

ROBERT C. LIVESAY, OF MOLINE, ILLINOIS, ASSIGNOR TO DEERE & COMPANY, OF MOLINE, ILLINOIS, A CORPORATION OF ILLINOIS.

MOWER.

Application filed October 23, 1919. Serial No. 332,764.

*To all whom it may concern:*

Be it known that I, ROBERT C. LIVESAY, a citizen of the United States, and a resident of Moline, in the county of Rock Island and State of Illinois, have invented certain new and useful Improvements in Mowers, of which the following is a specification, reference being had to the accompanying drawings.

My invention relates to harvesting machinery, and has particularly to do with mowers and analogous implements equipped with tongue trucks through which the implement is steered. In implements of this description the tongue truck is steered by lateral deflection in one direction or the other of a front tongue section or pole tongue pivotally connected to a rigid stub tongue in such manner that it is capable of swinging laterally, and operatively connected with the tongue truck so as to control its position. The object of my invention is to provide a mower of this description with improved means by which the draft of the team may be distributed between the main frame and the coupling frame of the mower without being subject to disturbance by reason of the movement of the front tongue section incident to the traveling of the team over rough ground or because of the turning of the tongue truck as in steering the implement. I accomplish my object as illustrated in the accompanying drawings and as hereinafter described. What I regard as new will be set forth in the claims.

In the accompanying drawings,—

Fig. 1 is a side elevation of a mower embodying my invention, the wheels at one side being removed, and certain parts being in section; and Fig. 2 is a plan view thereof, part of the finger bar being omitted.

Referring to the drawings,—3 indicates the main frame of the mower which may be of any approved construction, and is supported by wheels 4—5, as usual. 6 indicates the usual drag bar which extends transversely of the front of the mower and is pivotally connected at one end with the main frame by a pivot 7. 8 indicates a shoe bracket which is pivotally connected with the opposite end of the drag bar 6 so as to swing about a transverse axis, and 9 indicates a diagonally-disposed thrust bar which is pivotally connected at its forward end with the bracket 8, and at its rear end is pivotally connected with the main frame 3 in the usual way. The parts 6—8—9 constitute the usual coupling frame arranged to permit the bracket 8 to rise and fall, and also to rock about a transverse axis. The operating parts of the mower may be of any approved construction, such, for example, as that shown and described in Letters Patent No. 1,147,708, granted July 27, 1915, to Joseph Dain. 10 indicates the usual inner shoe, 11 the finger bar, and 12 the cutter bar, which may be of any suitable construction. 12$^a$ and 12$^b$ indicate ordinary hand-levers connected in any usual manner to the coupling frame, and adapted, respectively, for raising and lowering the coupling frame and rocking the shoe bracket.

13 indicates a stub tongue which is rigidly secured at its rear end to the main frame 3, as shown in the drawings. 14 indicates a whiffle-tree which is pivotally connected with the forward portion of the tongue 13, being mounted upon a pivot 15 carried by slotted straps 16—17 which project beyond the forward end of the tongue 13, as shown in Fig. 1. The straps 16—17 are slotted to receive the pivot 15 so that the whiffle-tree is capable of being moved rectilinearly fore and aft, or longitudinally of the tongue under the influence of the draft, which construction permits the distributer bar 24 hereinafter mentioned to act to some extent as an equalizer and also permits of the required rising and falling movements of the cutting apparatus in passing over rough ground, as well as permitting such apparatus to be elevated when the hand-levers are manipulated. The whiffle-tree 14 carries single-trees 18—19 connected with its end portions by straps 20—21 in the usual way, as shown in Fig. 2. 22 indicates a yoke which is connected centrally with the whiffle-tree 14, and is connected by a rod 23 with the intermediate portion of a distributer bar 24, shown in Fig. 1. The bar 24 is pivotally connected at its upper end with the stub tongue 13 by a pivot 25, and at its lower end is connected by a link 26 with an ear 27 which projects forward from the shoe bracket 8, as shown in the drawings. Thus the draft of the team is distributed between the main frame and the coupling frame of the mower, the distributer bar acting to divide the draft between the cutting apparatus and the wheel frame.

28 indicates an intermediate tongue section which is pivotally connected at the forward portion of the tongue 13 by a vertical pivot 29 so that said tongue section may swing laterally independently of the tongue 13. 30 indicates a spacer block between the tongue section 28 and the tongue 13. 31 indicates a front tongue section which is pivotally connected with the intermediate tongue section 28 by a horizontal pivot 32 and a hinge strap 33 which is secured to the rear end of the front tongue section 31. This tongue strap 33 is preferably channeled, or provided with a socket to receive the tongue section 31, so that the parts are held rigidly against lateral movement. The intermediate tongue section 28, therefore, swings laterally with the front tongue section 31, and the latter tongue section is capable of vertical movement independently of the intermediate tongue section.

34—35 indicate ground-engaging steering wheels, the peripheries of which are suitably shaped so that they penetrate the ground to some extent. Preferably they are V-shaped in cross-section, as shown in Fig. 2. These wheels are mounted upon an arched axle 36, the intermediate portion of which is connected with the lower end of a bail or crank 37 mounted to swing about a vertical axis. The axle 36 is connected with the crank 37 by means of a sleeve bracket 38 secured to the axle and fitted upon the lower arm of the crank as shown in Fig. 1, and the axle is braced to the crank by braces 39—40 which extend from the end portion of the axle 36 to the lower arm of the crank 37, as shown in the drawings. The upper arm of the crank 37 is bent at right angles to form a journal 41 which is mounted in a suitable bearing carried by the tongue 13, said bearing preferably being formed in the straps 16—17, as illustrated in Fig. 1. The intermediate portion of the crank 37, which extends forward from its axis, is pivotally connected by a slotted connection with the forward portion of the intermediate tongue section 28, as best shown in Fig. 1. By this construction, when the front tongue section 31 is swung laterally in either direction, the crank 37 is swung correspondingly, thereby directing the wheels 34—35 in the same direction to guide the machine. The wheels also take the weight of the draft devices and connecting parts, thereby affording considerable relief to the team. Since the equalizer bar 24 and the whiffle-tree 14 are both mounted on the stub tongue and are not connected with the front tongue section 31 they are not affected by movement of said front tongue section or by the turning of the wheels of the tongue truck in steering the implement, as all the draft is transmitted directly from the whiffle-tree to the equalizer bar and is distributed therefrom, a part to the coupling frame and a part to the wheel frame; consequently the proper distribution of the draft between the main frame and the coupling frame is not disturbed by the operation of the machine. Furthermore, by connecting the tongue truck with the stub tongue and mounting the whiffle-tree on the stub tongue as described, the team is positioned far enough forward so that the truck wheels do not interfere with the hind feet of the horses, and the team is absolutely free of draft influence as the truck sustains any down pressure due to the elevation of the whiffle-tree above the line of direction of the draft.

What I claim as my invention and desire to secure by Letters Patent, is—

1. The combination with a mower comprising a main frame, a coupling frame, and a stub tongue rigidly connected with said main frame, of ground-engaging steering means supporting the forward portion of said stub tongue, draft devices mounted on the stub tongue to move rectilinearly thereon in a fore and aft direction under the influence of the draft, and power distributing means movably mounted on said stub tongue and connected with said coupling frame and with the draft devices and actuable by the draft force to transmit the draft partly to the main frame and partly to the coupling frame.

2. The combination with a mower comprising a main frame, a coupling frame, and a stub tongue rigidly connected with said main frame, of ground-engaging steering means supporting the forward portion of said stub tongue, draft devices mounted on the stub tongue to move rectilinearly thereon in a fore and aft direction under the influence of the draft, and a distributor bar pivotally mounted on the stub tongue and connected with the draft devices and with the coupling frame at different distances from the pivot for transmitting the draft partly to the main frame and partly to the coupling frame.

3. The combination with a mower comprising a main frame, a coupling frame, and a stub tongue rigidly connected with said main frame, of ground-engaging steering means supporting the forward portion of said stub tongue, draft devices mounted on the stub tongue to move rectilinearly thereon in a fore and aft direction under the influence of the draft, a vertically-disposed distributor bar pivotally connected at its upper end with the stub tongue, means connecting the lower end portion of said bar with the coupling frame, and means connecting the intermediate portion of said bar with the draft devices.

ROBERT C. LIVESAY.